(12) United States Patent
Chouta et al.

(10) Patent No.: US 12,032,564 B1
(45) Date of Patent: Jul. 9, 2024

(54) TRANSFORMING NATURAL LANGUAGE REQUEST INTO ENTERPRISE ANALYTICS QUERY USING FINE-TUNED MACHINE LEARNING MODEL

(71) Applicant: SAP SE, Walldorf (DE)

(72) Inventors: Suchin Chouta, Udupi (IN); Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/149,263

(22) Filed: Jan. 3, 2023

(51) Int. Cl.
*G06F 16/24* (2019.01)
*G06F 16/242* (2019.01)
*G06F 16/2455* (2019.01)
*G06N 5/02* (2023.01)

(52) U.S. Cl.
CPC ........ *G06F 16/243* (2019.01); *G06F 16/2455* (2019.01); *G06N 5/027* (2013.01)

(58) Field of Classification Search
None
See application file for complete search history.

(56) References Cited

U.S. PATENT DOCUMENTS

| | | | | |
|---|---|---|---|---|
| 11,100,106 | B1 * | 8/2021 | Sainanee | G06F 16/2453 |
| 2018/0089705 | A1 * | 3/2018 | Duncker | G06F 16/243 |
| 2019/0087728 | A1 * | 3/2019 | Agarwal | G06F 16/2455 |
| 2019/0370393 | A1 * | 12/2019 | Finch | G06F 16/3338 |
| 2022/0374604 | A1 * | 11/2022 | Sivakumar | G06F 16/90332 |
| 2023/0325725 | A1 * | 10/2023 | Lester | G06F 16/2455 |
| 2023/0334045 | A1 * | 10/2023 | Bergman | G06F 16/285 |
| 2023/0353648 | A1 * | 11/2023 | Troiani | G06F 16/2379 |

* cited by examiner

*Primary Examiner* — Son T Hoang (74) *Attorney, Agent, or Firm* — Buckley, Maschoff & Talwalkar LLC (57) ABSTRACT

A system for enterprise analytics may include a Machine Learning ("ML") model data store containing at least one generic ML model and a fine-tuning data store containing prior natural language user requests and associated enterprise database queries generated by analysts. The system may also include an enterprise data store containing enterprise business data. A transformation framework may retrieve the generic ML model and fine-tune the model using the prior user requests and associated enterprise database queries to create a fine-tuned ML model. The framework may then receive a new natural language request from a user and use the fine-tuned ML model and new natural language request to automatically create a new enterprise analytics query. The new enterprise analytics query may then be executed to fetch enterprise analytics data from the enterprise data store. In some embodiments, an analytics chart may be automatically created and provided to the user.

19 Claims, 13 Drawing Sheets

| Text | OData Query |
|---|---|
| Get number of call count grouped by application name, which is from date 021-08-29T00:00:00Z to 2021-11-29T23:00:59Z | $apply=filter((CreatedTime%20ge%202021-08-29T00:00:00Z%20and%20CreatedTime%20le%202021-11-29T23:00:59Z))/groupby((ApplicationName),aggregate(CallCount%20with%20sum%20as%20sumCallCount))&$orderby=ApplicationName |
| Get top 5 api calls for the developers | $apply=groupby((DeveloperName),aggregate(CallCount with sum as sumCallCount))&$top=5 |
| get analytics data to fetch responsecode based on call count from date 2021-09-15T00:00:00Z and 2021-12-15T23:00:59Z | $apply=filter((CreatedTime%20ge%202021-12-09T00:00:00Z%20and%20CreatedTime%20le%202021-12-15T23:00:59Z))/groupby((ResponseCode),aggregate(CallCount%20with%20sum%20as%20sumCallCount)) |
| Call count for top browsers | $apply=filter((CreatedTime ge 2021-08-29T00:00:00Z and CreatedTime le 2021-11-29T23:00:59Z))/groupby((PlatformName),aggregate(CallCount with sum as sumCallCount))&$top=5&$orderby=sumCallCount desc |
| get odata query with average of callcount grouped for useragent | $apply=groupby((userAgent),aggregate(CallCount%20with%20avg%20as%20sumCallCount))&$orderby=userAgent |

TRANSFORMING NATURAL LANGUAGE REQUEST INTO ENTERPRISE ANALYTICS QUERY USING FINE-TUNED MACHINE LEARNING MODEL

BACKGROUND

An enterprise may store business information related to the operation of the enterprise. This information is typically accessed using a specialized query language or protocol that might not be familiar to most users. For example, a manager might describe the type of information is of interest (e.g., "what were the top five Application Programming Interface ("API") calls for developers during this specific time period?") to a business intelligence engineer or data analyst. The business intelligence engineer or data analyst may then translate that request into the needed query language or protocol, run the query, and provide the requested information back to the manager (e.g., in the form of an analytics chart or graph). Such an approach can be time consuming and costly. Moreover, the process can be error-prone (e.g., requiring follow-up questions and clarifications) and impractical—especially when a substantial number of users and/or requests are involved.

It would therefore be desirable to automatically perform enterprise analytics (e.g., in a cloud computing environment) in an efficient and accurate manner.

SUMMARY

According to some embodiments, methods and systems may perform enterprise analytics in an efficient and accurate manner. A system for enterprise analytics may include a Machine Learning ("ML") model data store containing at least one generic ML model and a fine-tuning data store containing prior natural language user requests and associated enterprise database queries generated by analysts. The system may also include an enterprise data store containing enterprise business data. A transformation framework may retrieve the generic ML model and fine-tune the model using the prior user requests and associated enterprise database queries to create a fine-tuned ML model. The framework may then receive a new natural language request from a user and use the fine-tuned ML model and new natural language request to automatically create a new enterprise analytics query. The new enterprise analytics query may then be executed to fetch enterprise analytics data from the enterprise data store. In some embodiments, an analytics chart may be automatically created and provided to the user.

Some embodiments comprise: means for retrieving, by a computer processor of a transformation framework from a ML model data store, a generic ML model; means for fine-tuning the generic ML model, using prior user requests and associated enterprise database queries from a fine-tuning data store, to create a fine-tuned ML model; means for receiving a new natural language request from a user via a remote user device; means for using the fine-tuned ML model and new natural language request to automatically create a new enterprise analytics query; and means for executing the new enterprise analytics query to fetch enterprise analytics data from an enterprise data store.

Some technical advantages of some embodiments disclosed herein are improved systems and methods associated with performing enterprise analytics in an efficient and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components, and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developer's specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
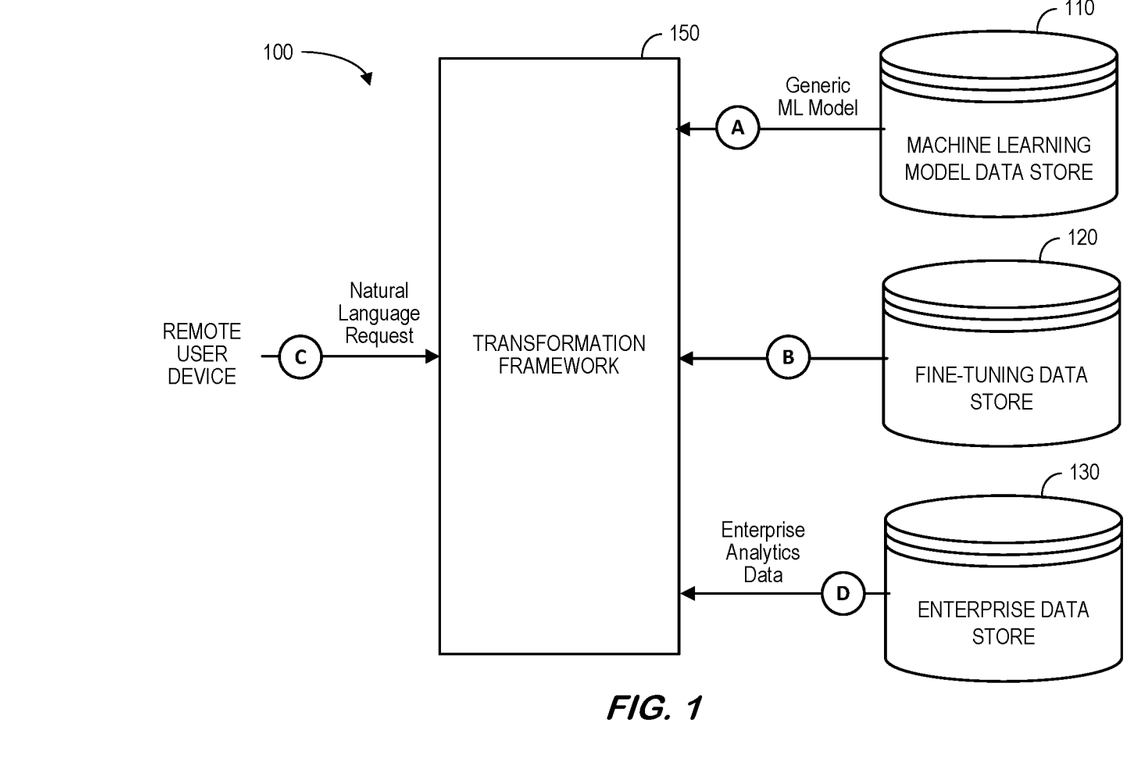
FIG. 1 is a high-level architecture for a system in accordance with some embodiments.

FIG. 1 is a high-level block diagram of a system 100 according to some embodiments. At (A), a transformation framework 150 may retrieve a generic Machine Learning ("ML") model from a ML model data store 110. At (B), the transformation framework 150 may use data from a fine-tuning data store 120 to create a fine-tuned ML model from the generic ML model. According to some embodiments, the data used to create the fine-tuned ML model and/or the fine-tuned model itself may also be stored in the ML model data store 110 (e.g., the ML model data store 110 may comprise a model repository).

At (C), the transformation framework 150 may receive a natural language request from a remote user device. For example, a manager might type or speak the request via a smartphone. The transformation framework 150 may then use the fine-tuned ML model to automatically change the natural language request into an appropriate enterprise analytics query. As used herein, the term "automatically" may refer to a process performed with little or no human intervention. The query can then be executed to fetch enterprise analytics data from an enterprise data store 130 at (D).

According to some embodiments, devices, including those associated with the system 100 and any other device described herein, may exchange data via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 100 may store data into and/or retrieve data from various data stores (e.g., the ML model data store 110, the fine-tuning data store 120, and/or the enterprise data store 130), which may be locally stored or reside remote from the transformation framework 150. Although a single transformation framework 150 is shown in FIG. 1, any number of such devices may be included. Moreover, various devices described herein might be combined according to embodiments of the present invention. For example, in some embodiments, the transformation framework 150 and the fine-tuning data store 120 might comprise a single apparatus. Some or all of the system 100 functions may be performed by a constellation of networked apparatuses, such as in a distributed processing or cloud-based architecture.

An operator (e.g., a database administrator) may access the system 100 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various mapping relationships) and/or provide or receive automatically generated recommendations, results, and/or alerts from the system 100.

Figure 2:
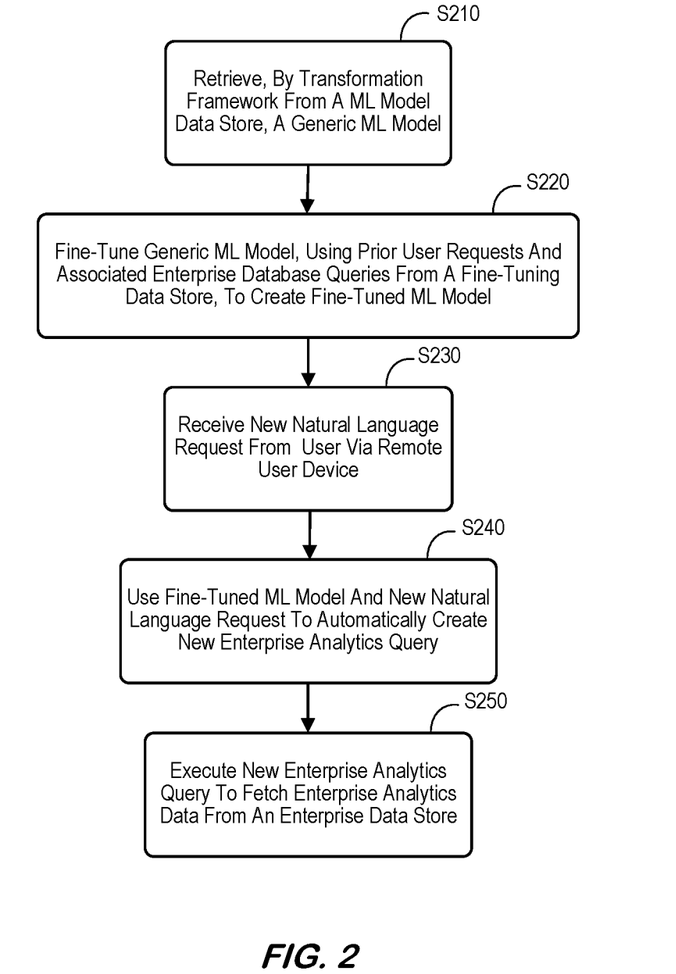
FIG. 2 illustrates a method according to some embodiments.

FIG. 2 illustrates a method to perform enterprise analytics in an efficient and accurate manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S210, a computer processor of a transformation framework may retrieve, from a Machine Learning ("ML") model data store, a generic ML model. As used herein, the phrase ML may refer to, for example, artificial intelligence techniques to leverage data and "learn" how to improve performance of a task. In some cases, a ML algorithm may build a model based on sample data (or "training data") to make predictions or decisions without being given explicit rules. According to some embodiments, the generic ML model is associated with an autoregressive language model that predicts future values based at least in part on past values. For example, the generic ML model might comprise a Generative Pre-trained Transformer ("GPT") model. The GPT model uses deep learning to produce appropriate text using a standard transformer network architecture with "generative pre-training." In some embodiments, the generic ML model is associated with a Text-To-Text Transfer Transformer ("T5"). T5 is a transformer-based architecture that uses a text-to-text approach. Every task (e.g., translation, question answering, and classification) is cast as feeding the model text as input and training it to generate target text output.

At S220, the system may "fine-tune" the generic ML model to create a fine-tuned ML model. As used herein, the term "fine-tuning" may refer to a way of applying or utilizing transfer learning. For example, fine-tuning may represent a process that takes a model that has already been trained for one task and then tunes or adjust the model to make it perform a different (but similar) task. The generic ML model may be fine-tuned, for example, using prior user requests and associated enterprise database queries (e.g., from a fine-tuning data store or the ML model data store) that were manually generated by a business intelligence engineer or data analyst.

At S230, a new natural language request may be received from a user via a remote user device. The natural language request might be provided, for example, via an interactive chatbot, voice-to-text translation, language translation, a dynamic series of questions and answers, etc. The system can then use the fine-tuned ML model and new natural language request to automatically create a new enterprise analytics query at S240. In some embodiments, the new enterprise analytics query is associated with a protocol for creation and consumption of queryable and interoperable Representational State Transfer ("REST") Application Programming Interfaces ("APIs"). For example, the query might be associated with the Open Data ("OData") protocol (e.g., version v2 or v4). In other embodiments, the query may be associated with a Structured Query Language ("SQL") protocol.

At S250, the new enterprise analytics query may be executed to fetch enterprise analytics data from an enterprise data store. In some embodiments, the transformation framework also automatically generates an analytics chart based on the fetched enterprise analytics data and transmits the analytics chart to the remote user device.

In this way, embodiments may provide a system for transforming a natural language request into an OData query (and simplify analytics chart rendering). Note that many enterprises fetch analytics data using the OData API. Embodiments described herein may build an OData query based on a user request (e.g., using various combinations of dimensions and measures when it comes to analytics data). Gaining domain knowledge needed to create an OData query is painful (e.g., it may require a deep understanding of OData specifications). Also, there are different version of OData available (e.g., v2 and v4), and understanding each version (and the capabilities of each version) can be a tedious and error prone undertaking.

To avoid this, embodiments may provide a natural language query tool for converting text into OData queries. Powered by ML, embodiments may enhance the value of existing data. It is similar to having a dedicated, on-call business intelligence engineer or data analyst available at all times, ready to give users timely, actionable insights. Embodiments may be fast making it easy to receive high-quality results presented in an acceptable manner.

Figure 3:
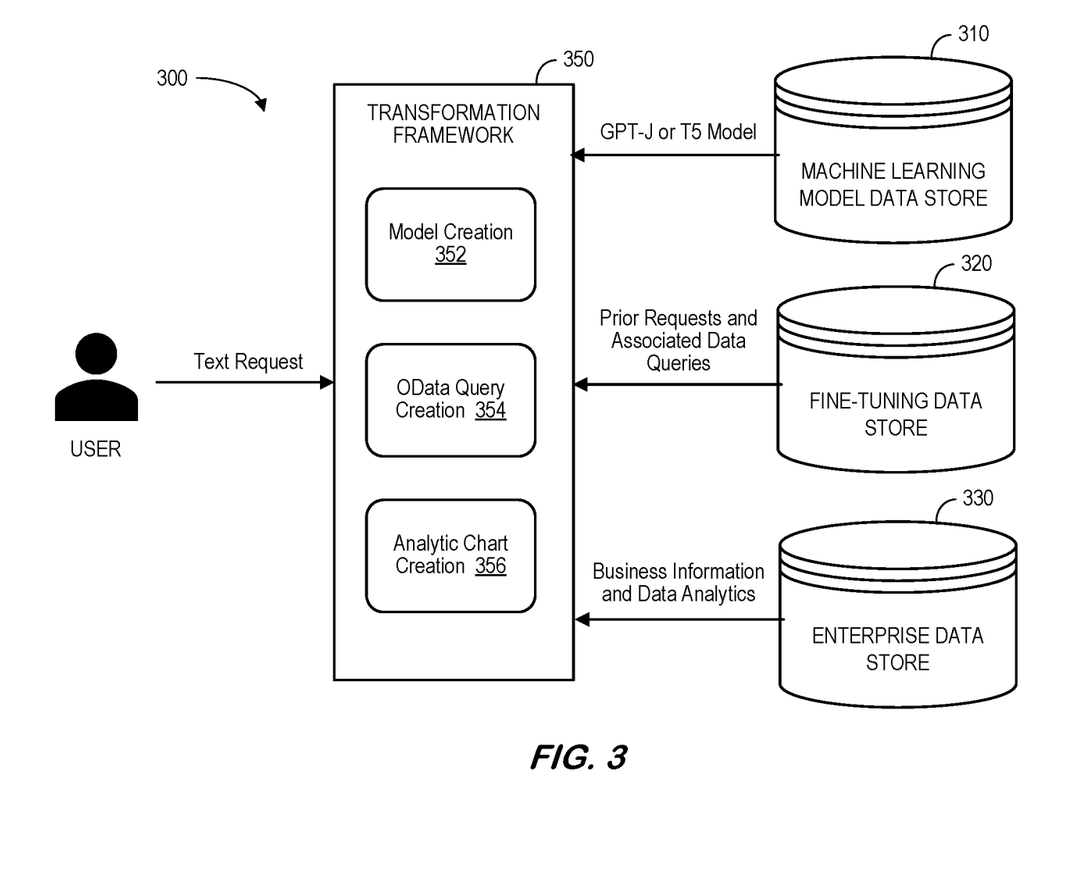
FIG. 3 is a more detailed architecture for a system in accordance with some embodiments.

Behind the scenes, embodiments may use T5 or GPT-J based fine-tuned models to convert text into OData queries to aid in analytics. For example, FIG. 3 is a more detailed architecture for a system 300 in accordance with some embodiments. A model creation 352 component of a transformation framework 350 may retrieve a generic GPT-J or T5 model from a ML model data store 310. An OData query creation 354 component of the transformation framework 350 may use prior user requests and associated OData queries (written by human experts) from a fine-tuning data store 320 to create a fine-tuned model from the generic model. The transformation framework 350 may receive a text request from a user device. The transformation framework 350 may then use the fine-tuned model to automatically change the text request into an appropriate OData query. The query can then be executed to fetch business information and data analytics from an enterprise data store 330. According to some embodiments, an analytic chart creation 356 component of the transformation framework 350 may generate a chart, based on the business information and data analytics, to be provided to the user.

Figure 4:
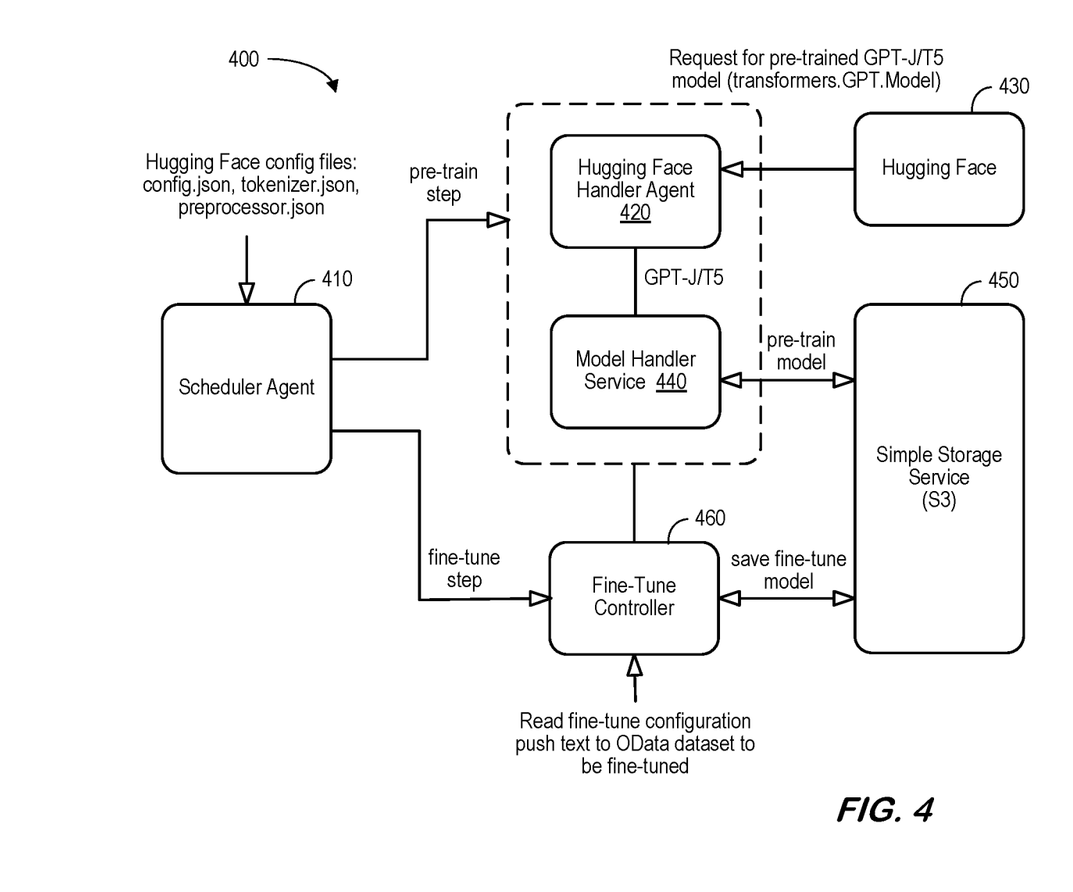
FIG. 4 illustrates pre-training and fine-tuning in a cloud computing environment according to some embodiments.

FIG. 4 illustrates pre-training and fine-tuning in a cloud computing environment 400 according to some embodiments. A scheduler agent 410 may access configuration files (e.g., config.json, tokenizer.json, preprocesser.json, etc.) and initiate a pre-train step. A handler agent 420 request a GPT-J or T5 model from, for example, Hugging Face 530. A model handler service 440 may then pre-train the model using, for example, information from an AMAZON® Simple Storage Service ("S3") 450. The scheduler agent 410 may then initiate a fine-tune step via a fine-tune controller 460. During fine-tune, the fine-tune controller reads a fine-tune configuration push text to OData dataset to create a fine-tuned model that is then stored in the S3 450.

Figure 5:
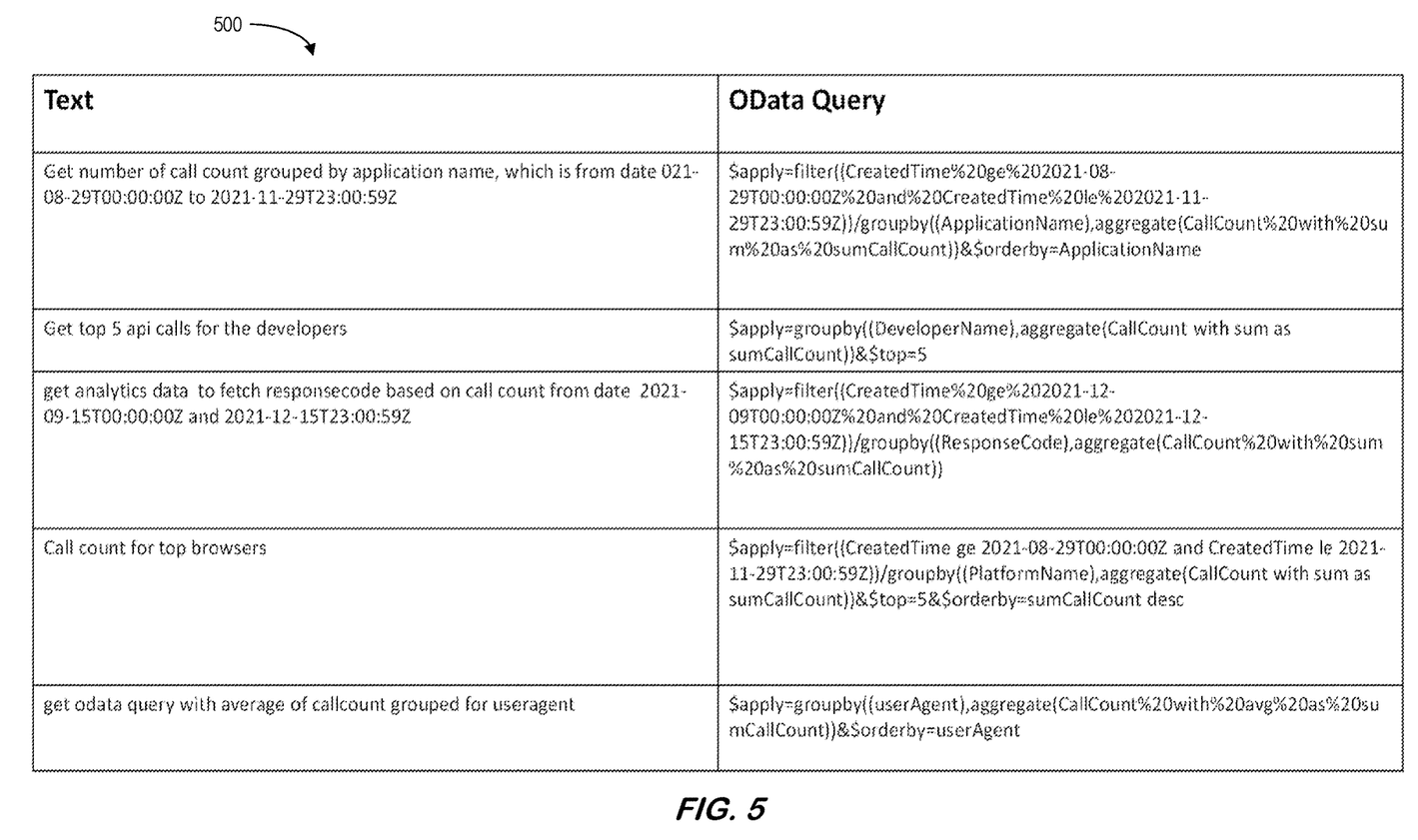
FIG. 5 is a table illustrating fine-tuning data in accordance with some embodiments.

FIG. 5 is a table 500 illustrating fine-tuning data in accordance with some embodiments. According to some embodiments, the table 500 includes a user query text and an associated OData query. For example, the user query text "Get top 5 api calls for the developers" resulted in the following OData query that was manually created by a business intelligence engineer or data analyst:

$apply=filter((CreatedTime%20ge%202021-12-09T00:
  00:00Z%20and%20CreatedTime%20le%202021-12-
  15T23:00:59Z))/groupby((ResponseCode),aggregate
  (CallCount%20with%20sum%20as%20sumCallCount))

By using these types of pairs of information, a model can be fine-tuned to "learn" how to create appropriate OData queries.

Figure 6:
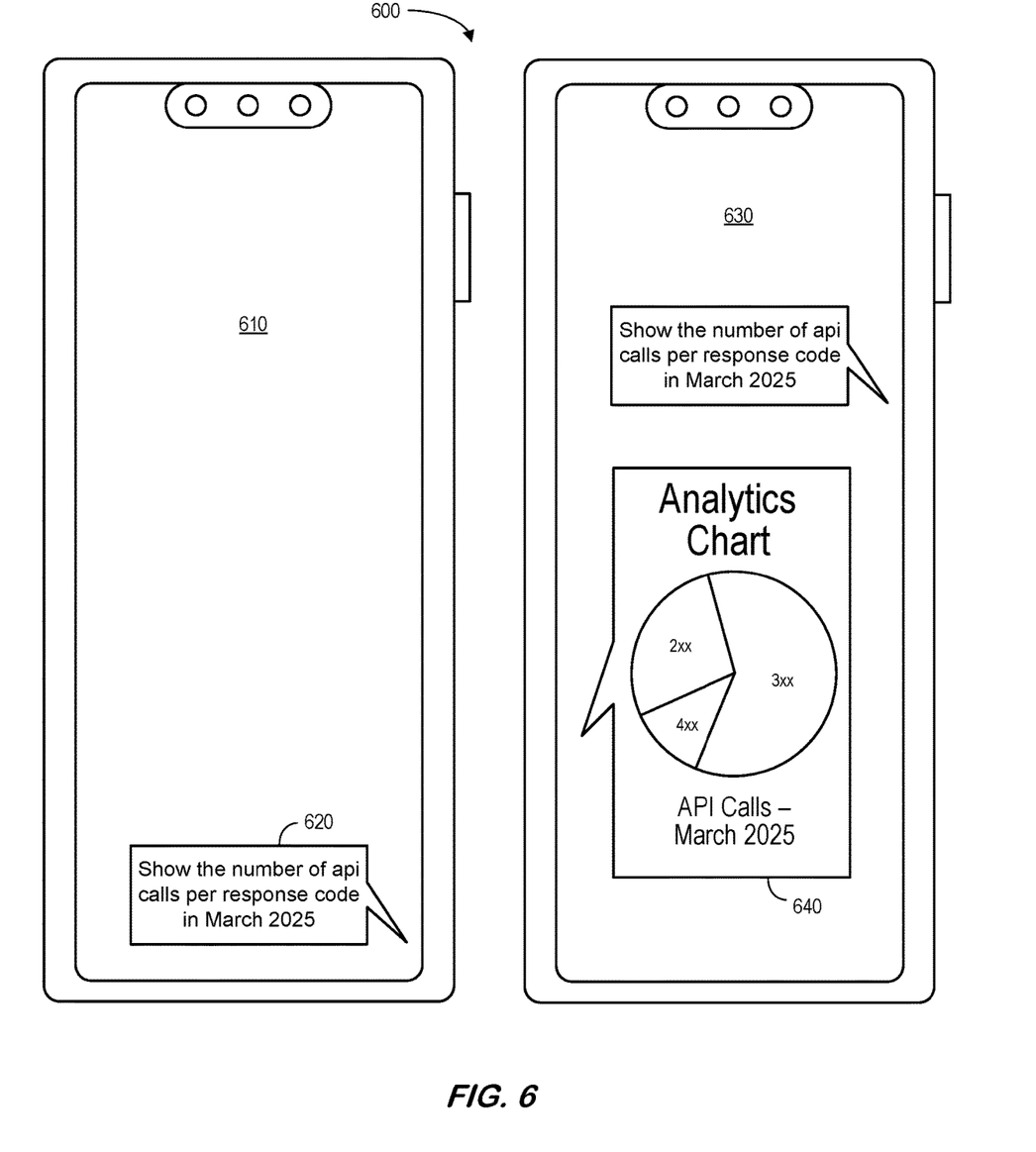
FIG. 6 is a user interface example according to some embodiments.
Figure 7:
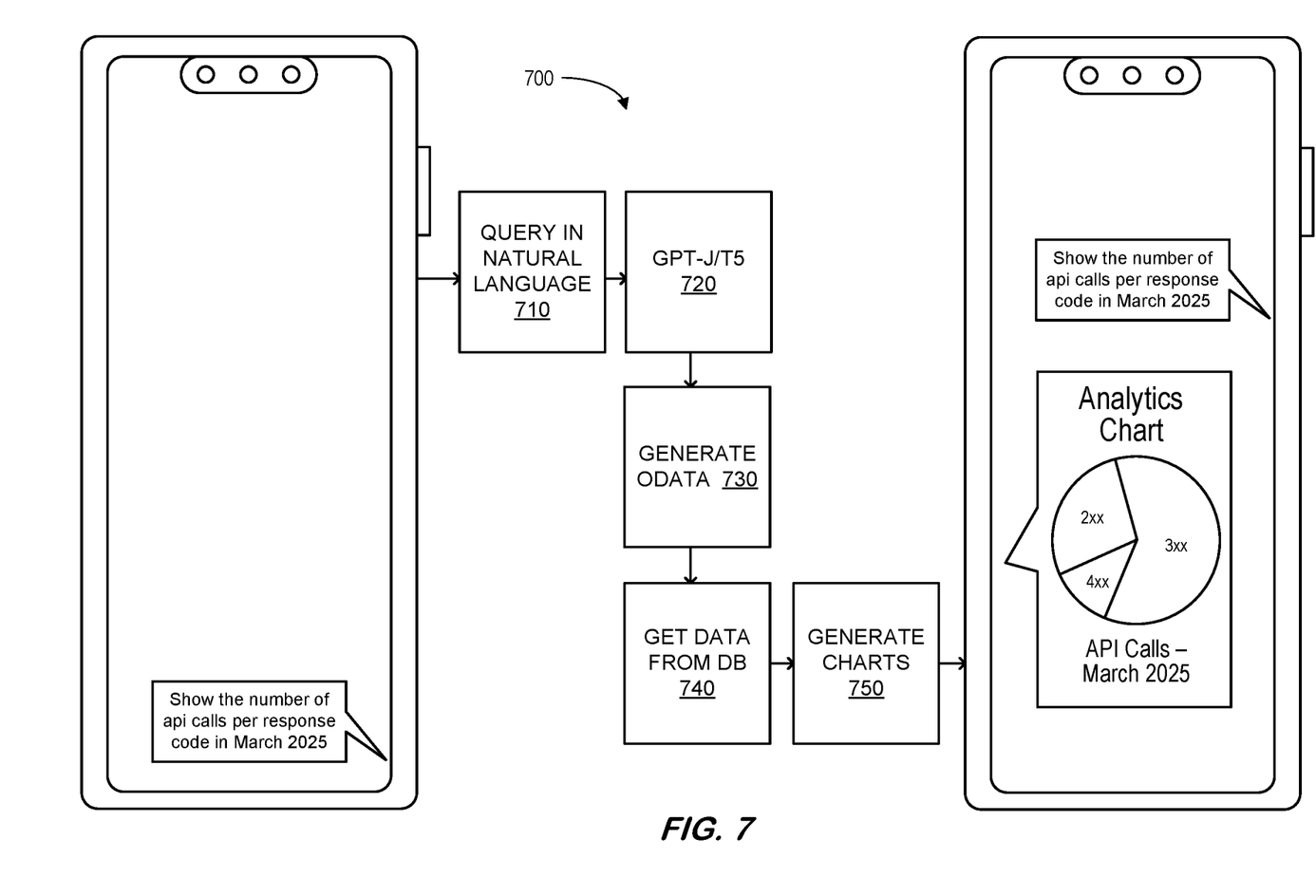
FIG. 7 illustrates how the user interface example of FIG. 6 is performed in accordance with some embodiments.

FIG. 6 is a user interface example 600 according to some embodiments. An initial display 610 includes a chatbot interface 620 into which a user may provide a natural language request "on-the-fly" ("show the number of API calls per response code in March 2025" as illustrated in FIG. 6). Responsive to the request, a response display 630 includes an analytic chart 640 containing the requested information. FIG. 7 illustrates how the user interface example 600 of FIG. 6 is performed 700 in accordance with some embodiments. In particular, after receiving a query in natural language 710 via an initial display an inference engine may be called. The inference engine may run the fine-tuned GPT-J or T5 model (or another suitable ML model) 720 to automatically generate an appropriate OData query 730. That query is then executed to retrieve the relevant business data from a database 740. The relevant business data can then be used to generate one or more analytic charts 750 that are then rendered for the user in a response display.

Figure 8:
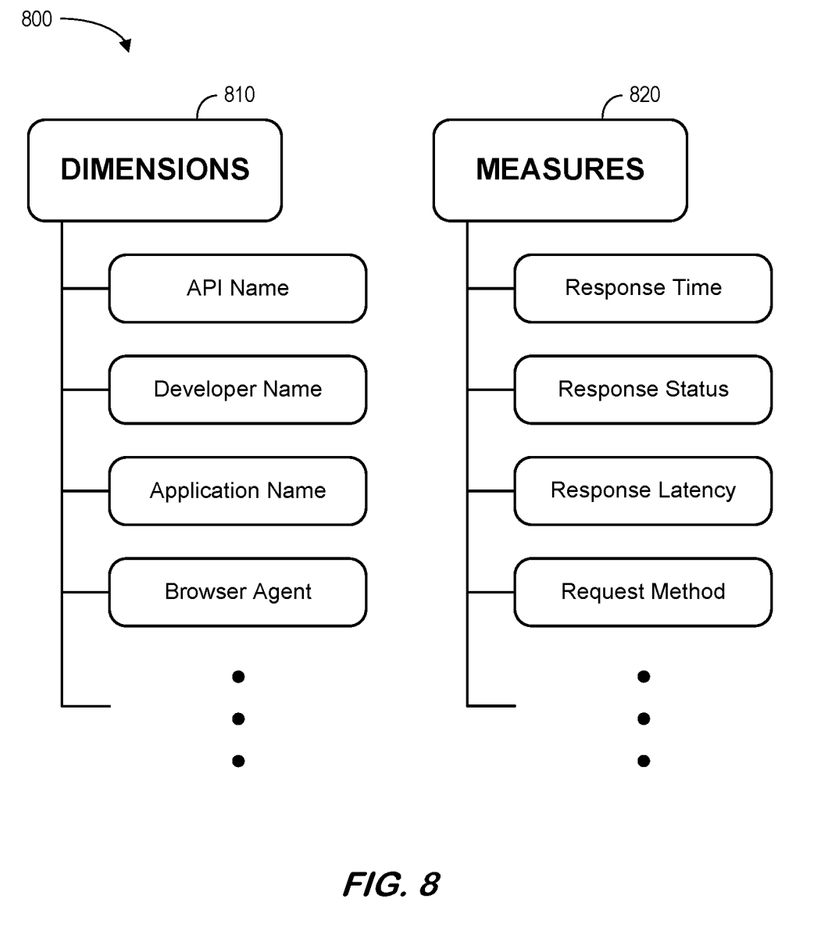
FIG. 8 is a shows enterprise analytics parameters according to some embodiments.

According to some embodiments, a text natural language user query utilizes multiple parameters. For example, FIG. 8 is a shows enterprise analytics parameters 800 according to some embodiments. The parameters 800 include dimensions 810 (e.g., API name, developer name, application name, browser agent, etc.) and measures 820 (e.g., response time, response status, response latency, request method, etc.). Note that there might 75 or more such parameters 800 that can be combined in various ways for a user request (and all such combinations may be handled by the fine-tuned ML model to create appropriate analytics charts).

Figure 9:
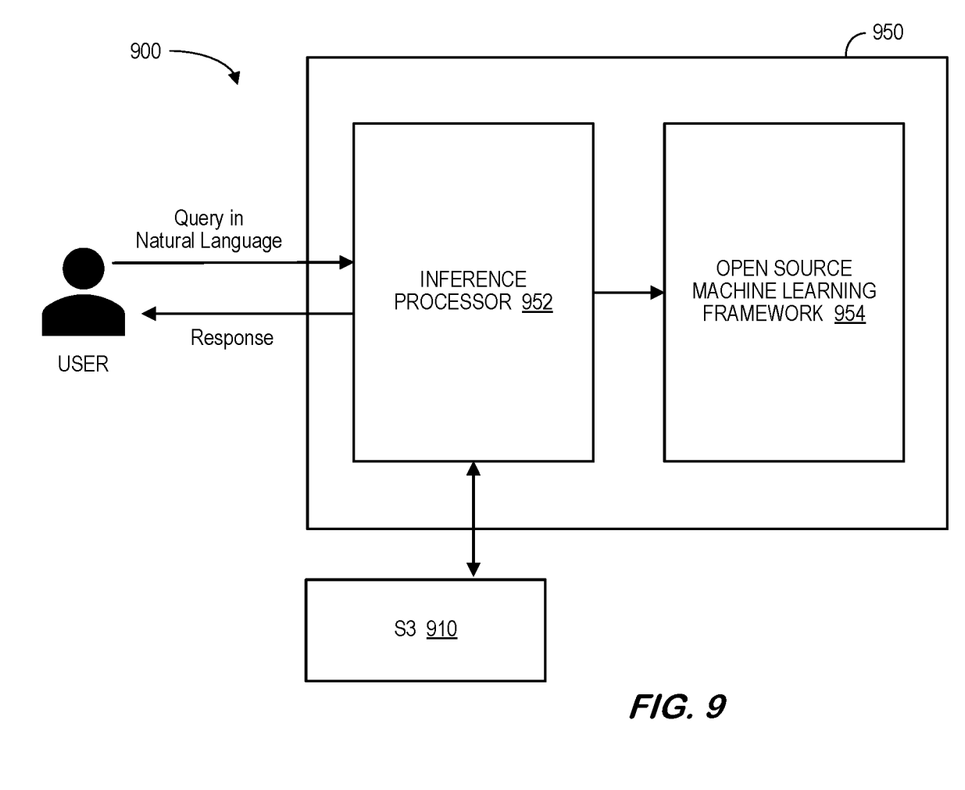
FIG. 9 shows an inference processing system in accordance with some embodiments.

FIG. 9 shows an inference processing system 900 in accordance with some embodiments. The system includes an inference engine 950 with an inference processor 952 that receives a query in natural language from a user. Moreover, the inference processor 952 may be coupled to an open source ML framework 954. According to some embodiments, the open source ML framework 954 includes PyTorch and custom libraries. PyTorch is a machine learning framework based on the Torch library that used for applications such as natural language processing. The inference processor 952 may then execute the fine-tune model (e.g., stored in S3 910) and provide an appropriate response to the user's request.

In addition to the integration with a chatbot user case, some embodiments may expose an inference engine as a service. That is, instead of an architecture that is strictly internal to an enterprise, embodiments may expose the inference engine via an API that provides a text natural language query as part of a payload (and includes the OData query as a payload).

Figure 10:
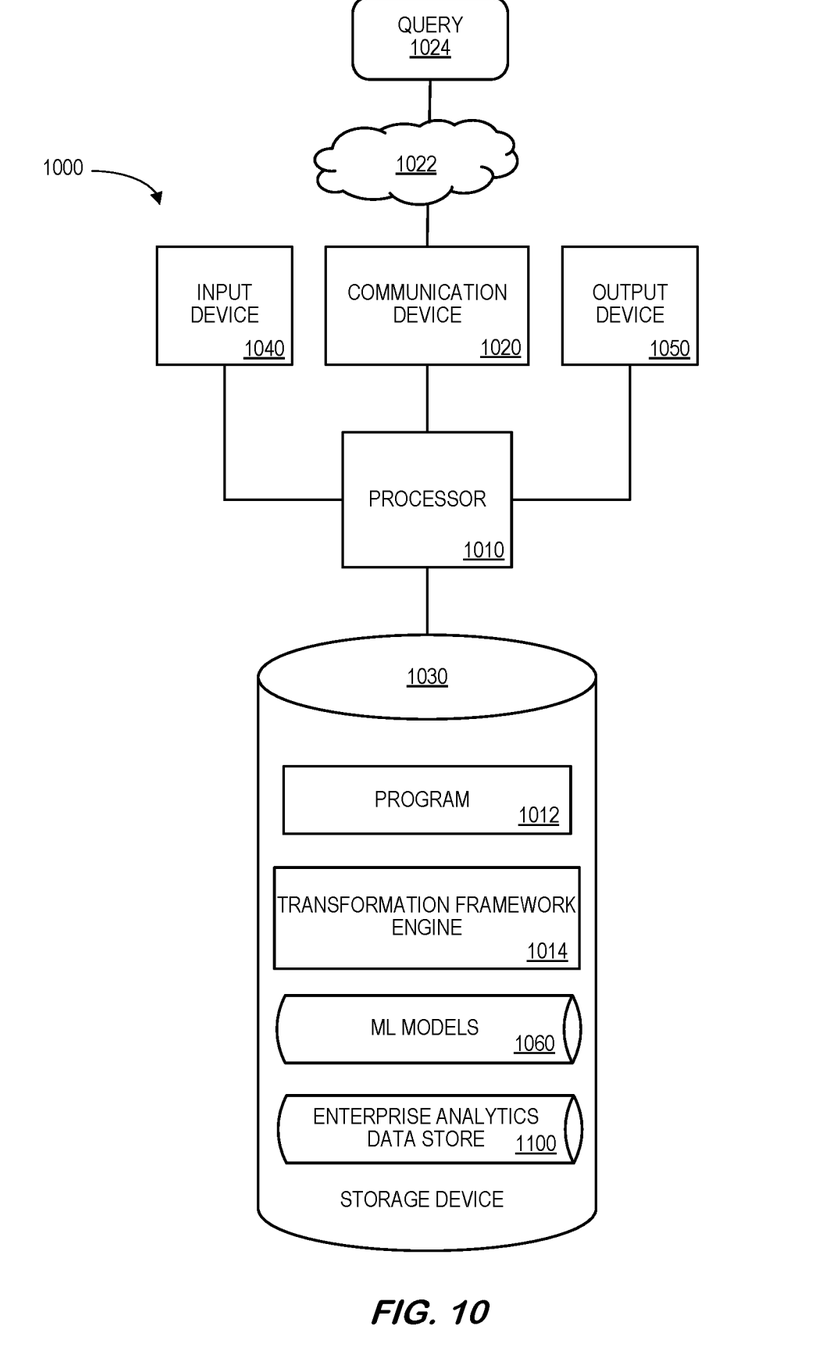
FIG. 10 is an apparatus or platform according to some embodiments.

Note that the embodiments described herein may be implemented using any number of different hardware configurations. For example, FIG. 10 is a block diagram of an apparatus or platform 1000 that may be, for example, associated with the systems 100, 300 of FIGS. 1 and 3, respectively (and/or any other system described herein). The platform 1000 comprises a processor 1010, such as one or more commercially available CPUs in the form of one-chip microprocessors, coupled to a communication device 1020 configured to communicate via a communication network (not shown in FIG. 10). The communication device 1020 may be used to communicate, for example, with one or more remote user platforms or a remote query device 1024 via a communication network 1022. The platform 1000 further includes an input device 1040 (e.g., a computer mouse and/or keyboard to input data about fine-tune data sources) and an output device 1050 (e.g., a computer monitor to render a display, transmit recommendations or alerts, and/or create monitoring reports). According to some embodiments, a mobile device and/or PC may be used to exchange data with the platform 1000.

The processor 1010 also communicates with a storage device 1030. The storage device 1030 can be implemented as a single database, or the different components of the storage device 1030 can be distributed using multiple databases (that is, different deployment data storage options are possible). The storage device 1030 may comprise any appropriate data storage device, including combinations of magnetic storage devices (e.g., a hard disk drive), optical storage devices, mobile telephones, and/or semiconductor memory devices. The storage device 1030 stores a program 1012 and/or transformation framework engine 1014 for controlling the processor 1010. The processor 1010 performs instructions of the programs 1012, 1014, and thereby operates in accordance with any of the embodiments described herein. For example, the processor 1010 may access generic ML model from a ML model data source 1060. The processor 1010 can then fine-tune the model using prior user requests and associated enterprise database queries to create a fine-tuned ML model. The processor 1010 may then receive a new natural language request from a user and use the fine-tuned ML model and new natural language request to automatically create a new enterprise analytics query. The new enterprise analytics query may then be executed by the processor 1010 to fetch enterprise analytics data from an enterprise business data store. In some embodiments, an analytics chart may be automatically created by the processor 1010 and provided to the user.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, data may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores the ML models 1060 and an enterprise analytics data store 1100. An example of a database that may be used in connection with the platform 1000 will now be described in detail with respect to FIG. 11. Note that the database described herein is only one example, and additional and/or different data may be stored therein. Moreover, various databases might be split or combined in accordance with any of the embodiments described herein.

Figure 11:
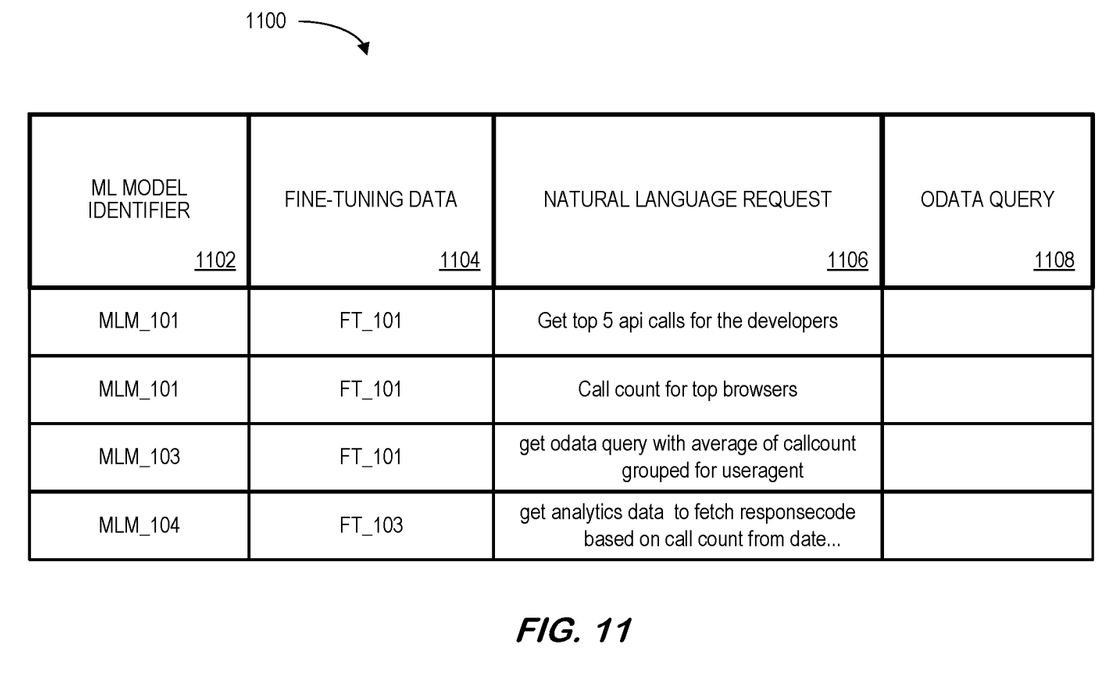
FIG. 11 illustrates an enterprise analytics data store in accordance with some embodiments.

Referring to FIG. 11, a table is shown that represents the enterprise analytics data store 1100 that may be stored at the platform 1000 according to some embodiments. The table may include, for example, entries identifying requests and associated queries created in connection with a cloud computing environment. The table may also define fields 1102, 1104, 1106, 1108 for each of the entries. The fields 1102, 1104, 1106, 1108 may, according to some embodiments, specify: a ML model identifier 1102, fine-tuning data 1104, a natural language request 1106, and an OData query 1108. The enterprise analytics data store 1100 may be created and updated, for example, when a new model is fine-tuned, when new requests are processed 1108, etc.

The ML model identifier 1102 might be a unique alphanumeric label or link that is associated with a generic ML model (e.g., a GPT-J or T5 model). The fine-tuning data 1104 may comprise prior user requests and associated enterprise database queries that were manually created by a business intelligence engineer or data analyst. The natural language request 1106 may comprise a text-based question or request being provided by a manager (who lacks specific OData knowledge). The natural language request 1106 might be typed or spoken by the manager (and translated into text via a SIRI® like process). The OData query 1108 is then automatically created by executing the fine-tuned ML model using the natural language request 1106.

Figure 12:
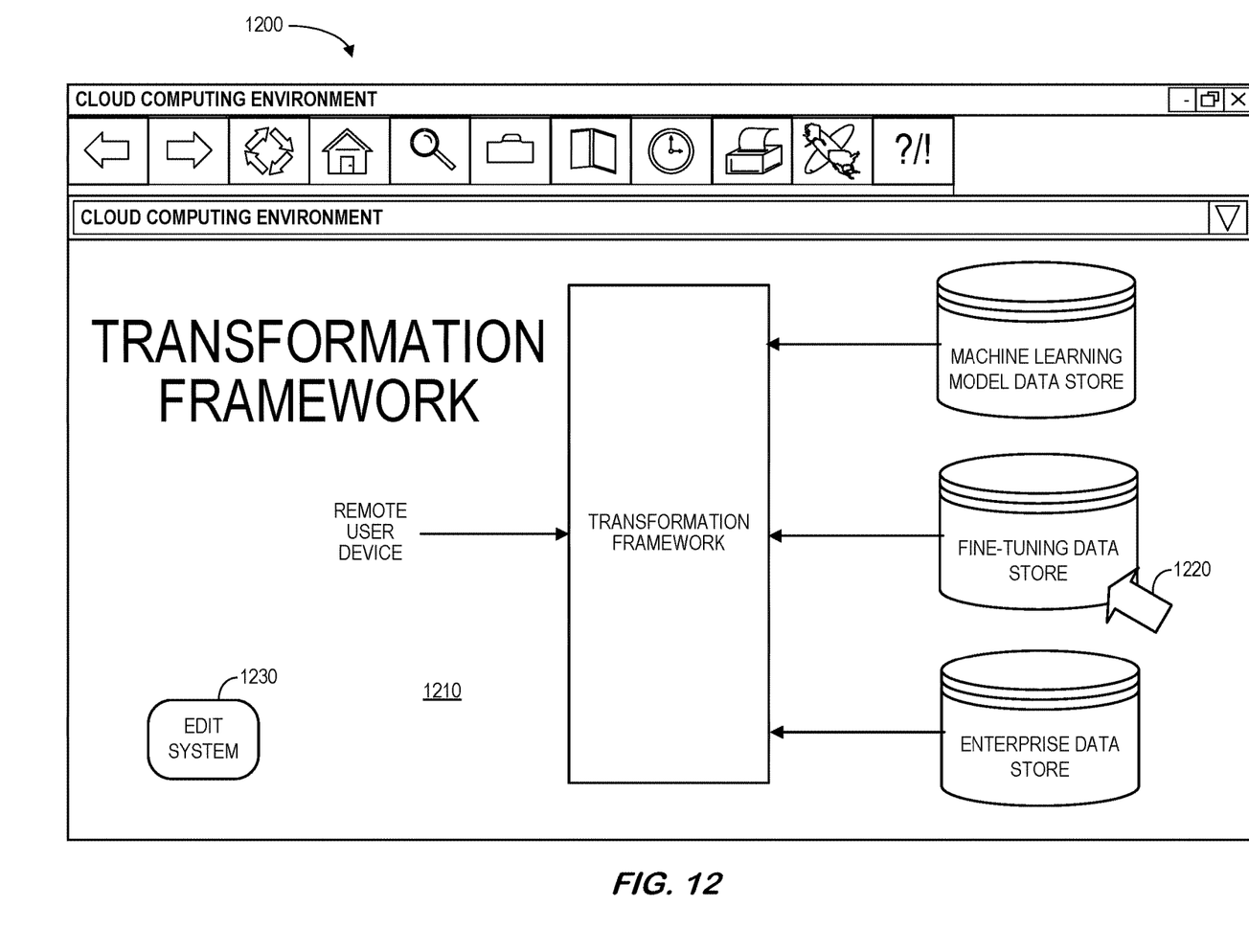
FIG. 12 is a human machine interface display in accordance with some embodiments.

FIG. 12 is a human machine interface display 1200 in accordance with some embodiments. The display 1200 includes a graphical representation 1210 or dashboard that might be used to manage or monitor a transformation framework (e.g., associated with a cloud provider). In particular, selection of an element (e.g., via a touchscreen or computer mouse pointer 1220) might result in the display of a popup window that contains configuration data. The display 1200 may also include a user selectable "Edit System" icon 1230 to request system changes (e.g., to investigate or improve system performance, to change a fine-tune data source, etc.).

Thus, embodiments may help a manager with little or no OData experience create OD queries that will return the relevant business information he or she is interested in (e.g., via analytic charts).

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
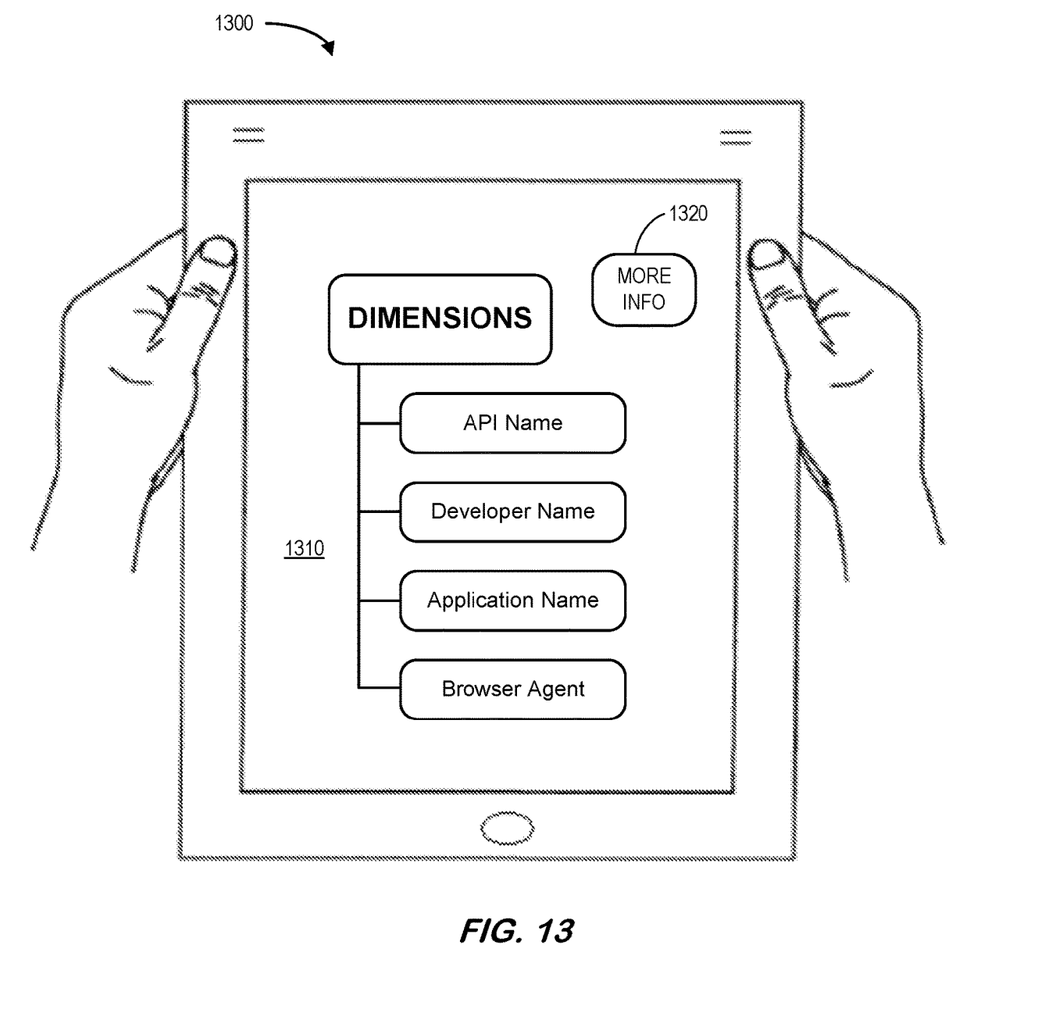
FIG. 13 illustrates a handheld tablet computer according to some embodiments.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of enterprise queries, any of the embodiments described herein could be applied to other types of enterprise situations. Moreover, the displays shown herein are provided only as examples, and any other type of user interface could be implemented. For example, FIG. 13 shows a handheld tablet computer 1300 rendering a parameters display 1310 that may be used to help a manager come up with an appropriate natural language request and/or to request additional parameters such as measures (e.g., via a "More Info" icon 1320).

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system associated with enterprise business analytics, comprising:
    a Machine Learning ("ML") model data store containing at least one generic ML model;
    a fine-tuning data store containing prior natural language user requests and associated enterprise business database queries that were manually generated by business intelligence engineers;
    an enterprise business data store containing enterprise business data; and
    a transformation framework coupled to the ML model data store, the fine-tuning data store, and the enterprise data store, including:
    a computer processor, and
    a computer memory coupled to the computer processor and storing instructions that, when executed by the computer processor, cause the transformation framework to:
        (i) retrieve the generic ML model from the ML model data store,
        (ii) fine-tune the generic ML model using the prior user requests and associated enterprise business database queries to create a fine-tuned ML model,
        (iii) receive a new natural language request from a user associated with the enterprise via an interactive chatbot and a remote user device,
        (iv) use the fine-tuned ML model and new natural language request to automatically create a new enterprise business analytics query that contains both multiple dimension parameters identifying a business application and measure parameters identifying response information, and (v) execute the new enterprise business analytics query to fetch enterprise business analytics data from the enterprise business data store.

2. The system of claim 1, wherein the transformation framework is further to automatically generate an analytics chart based on the fetched enterprise business analytics data.

3. The system of claim 2, wherein the transformation framework is further to transmit the analytics chart to the remote user device.

4. The system of claim 1, wherein the generic ML model is associated with at least one of: (i) an autoregressive language model, (ii) a Generative Pre-trained Transformer ("GPT") model, and (iii) a Text-To-Text Transfer Transformer ("T5") model.

5. The system of claim 1, wherein the new enterprise business analytics query can be, based on the new natural language request, associated with any of: (i) a protocol for creation and consumption of queryable and interoperable Representational State Transfer ("REST") Application Programming Interfaces ("APIs"), (ii) an Open Data ("OData") protocol, and (iii) a Structured Query Language ("SQL") protocol.

6. The system of claim 1, wherein the transformation framework is exposed as a service.

7. The system of claim 1, wherein the automatic creation of the new enterprise business analytics query is executed by an inference processor.

8. The system of claim 1, wherein the transformation framework is associated with a cloud-based computing environment.

9. The system of claim 1, wherein the dimension parameters include an Application Programming Interface ("API") name and a developer name.

10. A computer-implemented method associated with enterprise business analytics, comprising:

retrieving, by a computer processor of a transformation framework from a Machine Learning ("ML") model data store, a generic ML model;

fine-tuning the generic ML model, using prior user requests and associated enterprise business database queries, that were manually generated by business intelligence engineers, from a fine-tuning data store, to create a fine-tuned ML model;

receiving a new natural language request from a user associated with the enterprise via an interactive chatbot and a remote user device;

using the fine-tuned ML model and new natural language request to automatically create a new business enterprise analytics query that contains both multiple dimension parameters identifying a business application and measure parameters identifying response information; and executing the new enterprise business analytics query to fetch enterprise business analytics data from an enterprise business data store.

11. The method of claim 10, wherein the transformation framework is further to automatically generate an analytics chart based on the fetched enterprise business analytics data.

12. The method of claim 11, wherein the transformation framework is further to transmit the analytics chart to the remote user device.

13. The method of claim 10, wherein the generic ML model is associated with at least one of: (i) an autoregressive language model, (ii) a Generative Pre-trained Transformer ("GPT") model, and (iii) a Text-To-Text Transfer Transformer ("T5") model.

14. The method of claim 10, wherein the new enterprise business analytics query can be, based on the new natural language request, associated with any of: (i) a protocol for creation and consumption of queryable and interoperable Representational State Transfer ("REST") Application Programming Interfaces ("APIs"), (ii) an Open Data ("OData") protocol, and (iii) a Structured Query Language ("SQL") protocol.

15. A non-transitory, machine-readable medium comprising instructions thereon that, when executed by a processor, cause the processor to execute operations to perform a method associated with enterprise business analytics, the method comprising:

retrieving, by a computer processor of a transformation framework from a Machine Learning ("ML") model data store, a generic ML model;

fine-tuning the generic ML model, using prior user requests and associated enterprise business database queries, that were manually generated by business intelligence engineers, from a fine-tuning data store, to create a fine-tuned ML model;

receiving a new natural language request from a user associated with the enterprise via an interactive chatbot and a remote user device;

using the fine-tuned ML model and new natural language request to automatically create a new business enterprise analytics query that contains both multiple dimension parameters identifying a business application and measure parameters identifying response information; and executing the new enterprise business analytics query to fetch enterprise business analytics data from an enterprise business data store.

16. The medium of claim 15, wherein the transformation framework is exposed as a service.

17. The medium of claim 15, wherein the automatic creation of the new enterprise business analytics query is executed by an inference processor.

18. The medium of claim 15, wherein the transformation framework is associated with a cloud-based computing environment.

19. The system of claim 9, wherein the measure parameters include a response time, a response status, and a response latency.

* * * * *